April 1, 1958     E. J. SCHAEFER     2,829,288

SUBMERSIBLE MOTOR CONSTRUCTION

Filed July 26, 1954

INVENTOR.
Edward J. Schaefer,
BY
Davis, Lindsey, Hibben & Noyes
Atty's.

United States Patent Office 2,829,288
Patented Apr. 1, 1958

2,829,288

SUBMERSIBLE MOTOR CONSTRUCTION

Edward J. Schaefer, Fort Wayne, Ind.

Application July 26, 1954, Serial No. 445,847

12 Claims. (Cl. 310—87)

This invention relates to improvements in electric motors of the submersible type and particularly to submersible motors which utilize the submerging liquid in which the motor operates as the lubricant for the motor bearings.

In my earlier Patent No. 2,654,848, issued October 6, 1953, I have disclosed a unique submersible electric motor in which the stator is effectively sealed at its exterior by the motor casing and at its interior by a thin liner or sleeve. With this type of sealed stator construction the liquid in which the motor is submerged is permitted to enter the interior of the motor between the stator and rotor thereof and also around the upper and lower rotor bearings for lubricating the latter. In the case of a motor submerged in water, such as in a motor driven submersible pump unit, it is frequently desirable to minimize continuous circulation or replacement of water in the motor. For example, in the case of hard water or water having a relatively high content of dissolved salts or solids, the continuous passage of fresh water through the motor tends to result in a detrimental accumulation of solid deposits in the motor which eventually obstruct the air gap between the rotor and the stator thereby interfering with normal operation. Consequently, as disclosed in my copending application Serial No. 198,435, filed November 30, 1950, now Patent 2,698,911, the lower end of the motor may be closed so that the motor receives substantially only a single filling of water or other liquid. Thus, the difficulties which may arise from the deposition of solids at the interior of the motor are largely avoided while at the same time adequate bearing lubrication is obtained with the single filling of liquid in the motor.

It will be apparent that with a submersible electric motor of the foregoing character it is extremely important that the motor be filled with liquid at all times and particularly during the initial use of the motor when first installed. Moreover, for the reasons discussed above, it is frequently very advantageous to provide for substantially only a single initial filling of the motor with water or other liquid rather than continuous passage of fresh water through the motor. As will hereinafter appear in detail, the present invention permits the motor to be prefilled at the factory with water or other liquid of known quality so that a complete packaged unit is available which is already for immediate operation without any special precaution to insure filling of the motor with the submerging liquid prior to the initial start-up such as in a well. Moreover, by prefilling the motor with relatively pure water of known quality, the introduction of hard water or sand-containing water from the well is largely avoided thereby facilitating trouble-free operation of the motor.

Accordingly, a primary object of the present invention is to provide novel means in a submersible electric motor of the character described for insuring that the motor is filled with liquid.

A further object of the invention is to provide a novel submersible electric motor structure permitting prefilling of the motor with liquid for lubricating the motor bearings.

Another object of the invention is to provide novel means for obtaining substantially only a single liquid filling of a submersible electric motor of the character described with a liquid of known quality.

Still another object of the invention is to provide a liquid prefilled submersible electric motor having novel means for accommodating expansion of the liquid filling the motor.

An additional object of the invention is to provide a novel liquid prefilled submersible electric motor having means for permitting controlled introduction of additional liquid to the interior of the motor when required.

Other objects and advantages will become apparent from the following description taken in conjunction with the accompanying drawing, in which.

As heretofore mentioned, the present invention relates to submersible electric motors of such character that the liquid, such as water, in which the motor is submerged fills the interior of the motor between the stator and the rotor thereof. Motors of this type are frequently used in the bottom of a well and are connected to a pump to drive the latter. More specifically, the motor is usually suspended and receives its support from the pump casing and has its drive shaft connected to the shaft of the pump for operating the latter. Because of space restrictions, such a motor is usually made of small diameter but of quite elongated form.

Figure 1:
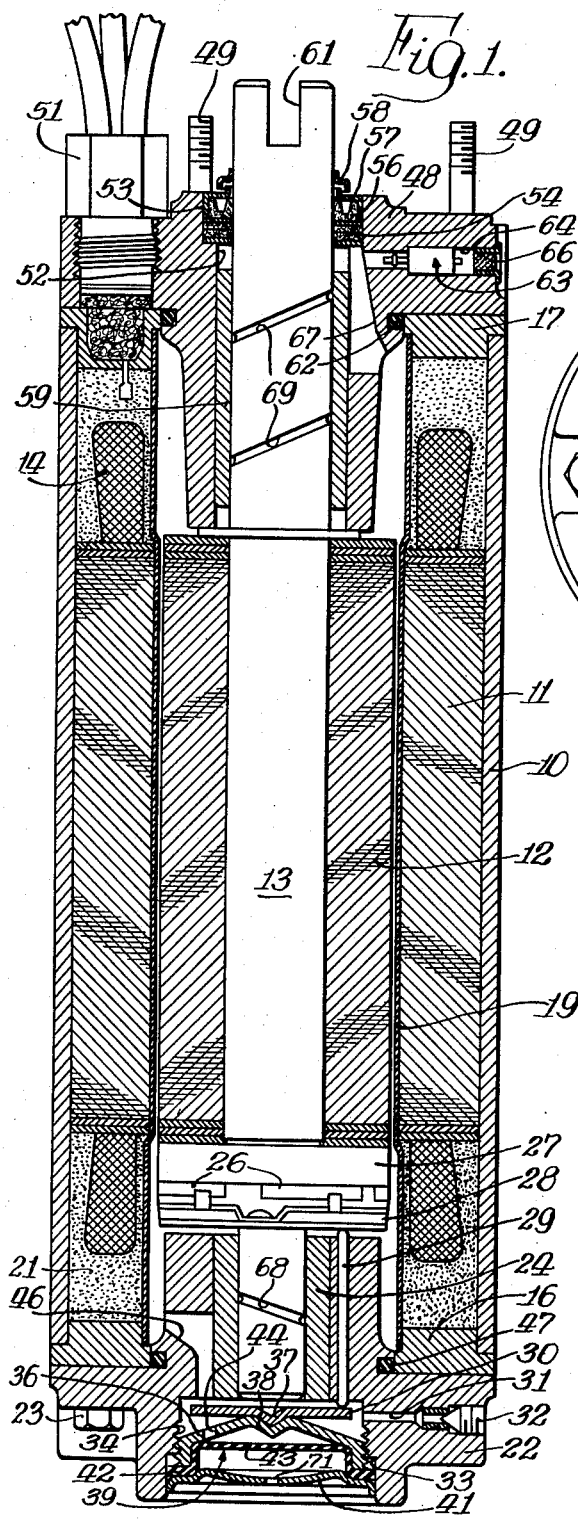
Fig. 1 is a longitudinal sectional view of a motor embodying the features of the invention.
Figure 2:
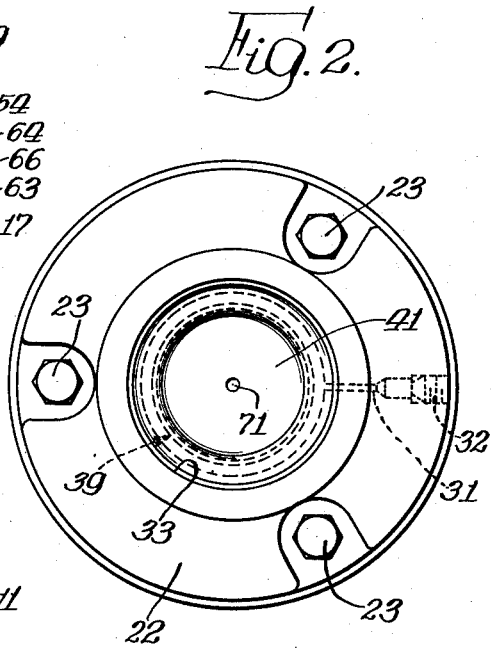
Fig. 2 is a bottom view of the structure shown in Fig. 1.

As shown in Fig. 1 of the drawing, a motor of the type herein contemplated may comprise an outer shell or casing in the form of a cylindrical metal sleeve 10, preferably of stainless steel, within which is mounted a stator 11 of annular form and a rotor 12 positioned within the stator. In the present instance, the stator and rotor are shown as being positioned intermediate the ends of the shell 10, and the rotor is carried on a shaft 13 supported in bearings located at the ends of the shell. The rotor 12 is protected from the liquid entering the motor by conventional methods such as plating, painting, or otherwise applying a protective exterior coating. The stator 11 has the usual laminated annular core structure with windings, the end turns of which are seen at 14, and end closures 16 and 17 secured, as by welding, to the shell 10. The stator exterior is, of course, sealed by the casing 10, and a thin metal liner 19, such as stainless steel foil, is utilized to seal the inner bore of the stator for protecting the windings from the liquid in the motor. As explained in detail in my aforementioned Patent No. 2,654,848, the liner 19 is thin enough to avoid interference with the electrical characteristics of the motor, and a suitable plastic filler material 21 fills the interstices between the stator windings and encases the end turns 14. The thin liner 19 is firmly secured in the stator bore, e. g. by an adhesive bond utilizing the plastic filler 21 or other suitable bonding material, and is rigidly secured at its ends, as by welding, to the end closures 16 and 17.

The bearing structure for the lower end of the rotor shaft 13 comprises a bottom cap 22 rigidly secured to the end closure 16 by means of a plurality of screws 23 extending through the cap and threaded into the end closure. For radial support of the shaft 13, a cylindrical radial bearing member 24 is mounted in a tubular extension on the cap 22 to embrace the lower end of the shaft 13. The bottom end of the motor also includes a thrust bearing structure of the type described in my copending application Serial No. 280,705, filed April 5, 1952. The thrust bearing includes a plurality of rockably mounted bearing segments or shoes 26 coacting with a thrust ring 27 rigidly secured on the shaft 13 for rotation therewith. An annular support 28 carries the bearing shoe assembly and is supported by a set of three elongated pins 29 extending through the tubular portion of the cap 22 to a pivot disk 30. The radial bearing member 24 as well as the thrust ring 27 are made of a material suitable for use with the liquid in which the motor operates. In the case of water, these two bearing members are preferably made of graphite. However, it will be understood that they may be made of any other suitable material depending upon the character of the liquid.

As mentioned above, the motor comprising the present invention is of the type in which the motor is submerged in a liquid and provision is made for prefilling the interior of the motor with a suitable liquid at the factory. In the embodiment of the invention illustrated in the drawing, the initial supply of liquid is introduced through a radially extending inlet passage 31 in the cap 22 which is fitted with a removable threaded closure plug or screw 32, and the lower end of the motor structure is substantially closed with the result that continuous flow of liquid through the motor structure is avoided. Thus, the bottom cap 22 has a central aperture 33 with a threaded portion 34 in which an inverted generally cup-shaped adjusting member 36 is operatively mounted. The pivot or leveling disk 30 of the thrust bearing arrangement has a central depressed portion 37 which is pivotally received in a complementary depression 38 in the member 36. The axial position of the rotor shaft 13 may be regulated by adjustment of the member 36.

Figure 3:
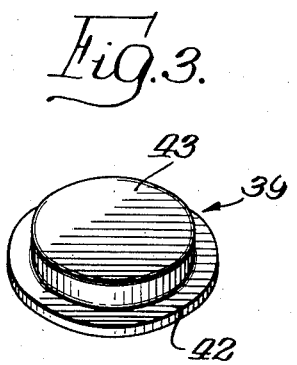
Fig. 3 is a perspective view of one element of the structure shown in Fig. 1.

A resilient one-piece inverted cup member 39 of rubber or the like (see Fig. 3) is mounted within the adjusting cup member 36, and a retainer or locking disk 41 has a tight frictional fit in the opening 33 below the rubber member 39. The edge portion of the disk 41 holds a thickened peripheral flange 42 of the member 39 seated tightly against the axial end of the member 36 and also peripherally against the wall of the opening 33 to give a water tight seal. The base or diaphragm portion, designated at 43, of the rubber cap 39 provides a resilient expansible closure for the bottom of the motor, and the member 36 has an aperture 44 so that the pressure of the liquid in the motor is transmitted to the diaphragm 43. Liquid which is introduced initially through the passage 31 passes into the upper part of the motor through a plurality of radial passages 46, and an O-ring seal 47 is provided to prevent leakage between the end cap 22 and the closure 16.

As will be seen from Fig. 1, the diaphragm 43 is spaced above the disk 41 and below the central portion of the member 36, the latter being bulged upwardly in dome-shaped fashion, so as to provide clearance for movement of the diaphragm in both directions. Obviously, such clearance is necessary for proper operation of the diaphragm in accommodating pressure and volume changes as hereinafter described.

At the upper end of the motor a cap 48 is provided which is connected to the upper end closure 17 and carries a plurality of connecting studs 49 for attaching the motor to a pump or the like. The cap 48 also carries electrical connecting means 51 which provides a power connection with the stator windings. The cap 48 is provided with a central bore 52 having a counterbore 53 at the upper end thereof, and a plurality of felt pads 54 and a shaft seal 56 in a seal retainer 57 are disposed in the counterbore 53 in sealing relation with the upper end of the shaft 13 which projects from the motor. A sand slinger 58 having a depending skirt in labyrinth relation with the seal retainer 57 is carried on the shaft 13.

Within the bore 52 is positioned a radial bearing member 59, preferably of graphite, which holds the upper end of the rotor shaft 13, properly positioned in the upper cap. The extreme upper end of the shaft 13 is provided with means for connecting it to the shaft of a pump or the like and in this instance is shown as having a transverse groove 61 into which a tongue on the pump shaft or on a separate coupling member may be inserted. An O-ring seal 62, similar to the seal 47, is also provided at the upper end of the motor structure. In addition, a low pressure check valve of a conventional type indicated generally at 63 is mounted in a radial bore 64 in the end cap 48 for admitting water to the interior of the motor when necessary, as hereinafter described in detail. A filter plug 66 of porous metal such as sintered bronze is also mounted in the passage 64 to prevent entry of sand or debris into the motor.

As mentioned above, the motor is prefilled by introduction of liquid of controlled quality through the filler hole 31 at the factory. In the case of a submersible motor for use in a water pumping unit, this prefilling liquid may conveniently be distilled or soft water which, preferably has added to it an anti-freeze agent or a corrosion inhibitor or both. Of course, prior to prefilling, the member 36 is adjusted to obtain the desired axial positioning of the rotor 12 and the sealing cup 39 and retainer disk 41 are installed. As the water or other prefilling liquid fills the interior of the motor, air is displaced through a plurality of radial passages 67 in the cap structure 48 and escapes through the passage 64, the internal valve member of the valve 63 and the porous plug 66 being temporarily removed during the prefilling operation to permit air venting. When the motor is completely filled with liquid, the screw plug 32 is inserted and the valve 63 and plug 66 are replaced so that the motor then contains a confined predetermined quantity of water or other liquid of known quality. The lower end of the motor structure is sealed by the rubber diaphragm 43, and at the upper end of the motor structure the escape of liquid is prevented by the check valve 63 and, for normal pressure conditions, by the shaft seal 56. Thus, the upper radial bearing 59 and the lower radial bearing 24 as well as the thrust bearing elements 26 and 27 are completely immersed and surrounded by lubricating liquid from the time the unit leaves the factory. The usual helical grooves, as indicated at 68 and 69 are provided in the end extremities of the rotor shaft 13 for facilitating lubrication thereof. As will be readily apparent, the prefilled motor structure of my invention can be transported or otherwise handled without danger of losing the internal liquid and upon installation the unit is ready for immediate operation without the necessity for any special precautions to insure that the motor is filled with liquid before being started for the first time.

In the non-prefilled type of submersible motor wherein the submerging liquid is used as the bearing lubricant, there are occasional instances of misoperation in which, for one reason or another, the interior of the motor does not get filled properly with liquid prior to initial operation and as a result the motor is seriously harmed by lack of proper bearing lubrication. Also, as heretofore discussed, when the submerging liquid is utilized as the principal filling liquid and lubricant for the interior of the motor, various difficulties can arise by reason of the introduction of sand or other foreign matter with the submerging liquid or by reason of the deposition of solids from the liquid such as in the case of hard water.

The present invention overcomes all of the foregoing difficulties because the motor is filled with liquid from the very beginning. Moreover, the liquid may be quite pure so as to avoid introduction of foreign matter or the deposition of solids within the motor. Furthermore, for normal operating conditions, there is no substantial replacement of the initial supply of prefilling liquid thereby avoiding difficulties from the foregoing sources for prolonged periods of operation.

Inasmuch as the quality of prefilling liquid within the motor is substantially confined, it is necessary to accommodate or compensate for changes in volume of this confined quantity of liquid due to changes in the temperature of the motor during operation thereof. Thus, as the motor operates nd its temperature rises, the increasing pressure of the confined liquid is communicated through the aperture 44 in the adjusting member 36 to the diaphragm portion 43 of the rubber seal cup 39. This resilient diaphragm may obviously expand to the extent of the space initially provided between the diaphragm 43 and the disk 41 whereby to take care of all normal increases in volume of the confined quantity of prefilling liquid. In this connection, the retainer disk 41 has an aperture 71 which allows the pressure of the head of the submerging liquid externally of the motor to be exerted against the lower or outer side of the rubber diaphragm 43. Consequently, it will be seen that the internal liquid pressure within the motor is substantially equalized with the external pressure of the submerging liquid thereby preserving the shaft seal 56 and preventing leakage therethrough. This is particularly important at the time the motor is first submerged whereupon the diaphragm 43 is displaced upwardly, to the extent of the space between it and the upwardly bulged member 36, by reason of the higher external liquid pressure. This movement of the diaphragm equalizes the internal motor pressure so that liquid is not drawn in through the valve 63. In the event of abnormal increases in temperature and pressure within the motor, for example, under a prolonged overload condition such that the liquid filling the interior of the motor is vaporized, the shaft seal 56 will ordinarily fail and provide a safety outlet.

The one-way check valve 63, although required to operate only infrequently, is necessary in order to permit external submerging liquid to reenter the interior of the motor in the event of loss of internal liquid under abnormal conditions such as mentioned above. In addition, if prefilling liquid is lost from the motor for any reason during shipment or handling prior to installation, the valve 63 which is arranged to operate at a low pressure differential will permit the necessary entry of additional liquid. The filter plug 66 prevents entry of sand or other undesirable solid matter at this point. Of course, entry of outside liquid such as water through the check valve 63 may result in the introduction of hard water instead of the relatively pure prefilling liquid which initially filled the motor. However, the quantity of outside water which enters through the valve 63 will usually be small in proportion to the amount of initial prefilling liquid, and in the event of an extreme emergency, it is essential that lubrication of the bearings be provided even if it necessitates the introduction of hard water into the motor.

Although the invention has been described with reference to a certain specific structural embodiment thereof, it is to be understood that various modifications and equivalent structures may be resorted to without departing from the scope of the invention as defined in the appended claims.

I claim:

1. A submersible motor comprising an annular stator having means for sealing the same against liquid both externally and internally, a rotor positioned within the stator, bearings at the opposite ends of said stator for journaling said rotor, closure means at the opposite ends of the stator for substantially closing the interior of the motor and thereby permitting the motor to be prefilled with an initial substantially confined quantity of liquid whereby to insure lubrication of said bearings, expansible means at one end of the motor adapted to be subjected to the pressure of said confined liquid for accommodating expansion thereof, said rotor having a shaft projecting through one of said closure means, one of the foregoing means having an opening therein, and one-way valve means mounted in said opening, said valve means being operable to admit submerging fluid into the interior of the motor in response to a drop in pressure within the motor upon loss of liquid therefrom.

2. A submersible motor comprising an annular stator having means for sealing the same against liquid both externally and internally, a rotor positioned within the stator, bearing means at the opposite ends of said stator for journaling said rotor, closure means at the opposite ends of the stator for substantially closing the motor interior and thereby permitting the motor to be prefilled with an initial substantially confined quantity of liquid whereby to insure lubrication of said bearing means, one of said closure means including an expansible element adapted to be exposed to the pressure of said confined liquid whereby to accommodate expansion of the latter, and the other of said closure means having a passage therethrough with a one-way valve mounted therein for admitting outside submerging liquid to the interior of the motor in response to a pressure drop within the motor upon loss of liquid therefrom.

3. A submersible motor comprising an annular stator having means for sealing the same against liquid both externally and internally, a rotor positioned within the stator, closure means at the opposite ends of said stator comprising cap members having flange portions operatively secured to the ends of the stator and axially extending tubular portions, bearing means within said tubular portions for journaling said rotor, said closure means substantially closing the motor interior thereby permitting the motor to be prefilled with an initial substantially confined quantity of liquid whereby to insure lubrication of said bearing means, and expansible means at one end of the motor adapted to be subjected to the pressure of said confined liquid for accommodating expansion thereof, one of said cap members having a radial passage in the flange portion thereof with a removable closure for permitting initial filling of the motor with liquid and the other of said cap members having a radial passage in the flange portion thereof with a one-way valve mounted therein for admitting outside submerging liquid to the interior of the motor in response to a pressure drop within the motor upon loss of liquid therefrom.

4. A submersible motor comprising an elongated external casing structure, an annular stator within said casing structure and having an inner lining connected to the casing structure for sealing the stator against liquid, a rotor mounted within the stator and having a rotor shaft, bearing means in the ends of the casing structure having said rotor shaft journaled therein with said shaft extending from the motor at one end of the casing structure, a shaft seal mounted around the projecting end of the rotor shaft for substantially sealing the interior of the motor at said one end thereof, said casing structure having a closable opening for prefilling the motor with an initial substantially confined quantity of liquid for insuring lubrication of said bearing means, expansible means at the opposite end of said casing adapted to be subjected to the pressure of said confined liquid for accommodating expansion thereof, and one-way valve means in said casing structure for admitting outside submerging liquid to the interior of the motor for replacing prefilling liquid lost therefrom.

5. A submersible motor for use in a water well comprising an annular stator having means for sealing the same against liquid both externally and internally, a rotor positioned within the stator, bearing means at the opposite ends of said stator for journaling said rotor, closure means at the opposite ends of the motor for substantially closing the interior of the motor, a substantially confined quantity of soft water filling the interior of the motor for insuring lubrication of said bearing means, expansible means at one end of the motor for accommodating expansion of said confined water, and one-way valve means for admitting well water to the interior of the motor as required to replace soft water lost from the motor.

6. A submersible motor for use in a water well comprising an annular stator having means for sealing the same against liquid both externally and internally, a rotor positioned within the stator, bearing means at the opposite ends of said stator for journalling said rotor, closure means at the opposite ends of the motor for substantially closing the interior of the motor, a substantially confined quantity of soft water containing an anti-freeze agent and filling the interior of the motor for insuring lubrication of said bearing means, expansible means at one end of the motor for accommodating expansion of said confined water, and one-way valve means for admitting well water to the interior of the motor as required to replace soft water lost from the motor.

7. A submersible motor comprising an upright annular stator, a rotor positioned within the stator, radial bearing means at the opposite ends of the motor for journaling the rotor, thrust bearing means at the lower end of said rotor, closure means at the ends of the motor for substantially closing the motor interior and thereby permitting the motor to be prefilled with an initiall substantially confined quantity of liquid whereby to insure lubrication of said radial and thrust bearing means, the closure means at the lower end of the motor having a central opening, an axially adjustable support for supporting said thrust bearing means and adjustably mounted in said opening for regulating the axial position of the rotor, an expansible diaphragm underlying said support and extending across said opening for sealing the lower end of the motor and accommodating expansion of said confined liquid, and locking means for holding said diaphragm seated against said support and in liquid-tight sealed relation in said opening.

8. A submersible motor comprising an upright annular stator, a rotor positioned within the stator, radial bearing means at the opposite ends of the motor for journaling the rotor, thrust bearing means at the lower end of said rotor including a plurality of bearing segments operatively supported on a leveling disk, closure means at the ends of the motor for substantially closing the motor interior and thereby permitting the motor to be prefilled with an initial substantially confined quantity of liquid whereby to insure lubrication of said radial and thrust bearing means, the closure means at the lower end of the motor including a cap member with a central opening, an axially adjustable supporting disk providing a central pivotal support for said leveling disk and adjustably mounted in said opening for regulating the axial position of the rotor, an expansible rubber diaphragm underlying said supporting disk and extending across said opening for sealing the lower end of the motor, and locking means for holding said diaphragm in liquid-tight sealed relation in said opening adjacent said supporting disk, said supporting disk having aperture means therein for transmitting the pressure of said confined liquid to said diaphragm whereby the latter can accommodate expansion of said confined liquid.

9. A submersible motor comprising an upright annular stator, a rotor positioned within the stator, radial bearing means at the opposite ends of the motor for journaling the rotor, thrust bearing means at the lower end of said rotor, closure means at the ends of the motor for substantially closing the motor interior and thereby permitting the motor to be prefilled with an initial substantially confined quantity of liquid whereby to insure lubrication of said radial and thrust bearing means, the closure means at the lower end of the motor including a cap member with a central opening, a support having a base portion for supporting said thrust bearing means and an axially extending flange portion threadedly mounted in said central opening whereby said support is adjustable axially of said opening for regulating the axial position of the rotor, and expansible diaphragm means underlying said support and extending across said opening for sealing the lower end of the motor and accommodating expansion of said confined liquid.

10. A submersible motor comprising an upright annular stator, a rotor positioned within the stator, radial bearing means at the opposite ends of the motor for journaling the rotor, thrust bearing means at the lower end of said rotor, closure means at the ends of the motor for substantially closing the motor interior and thereby permitting the motor to be prefilled with an initial substantially confined quantity of liquid whereby to insure lubrication of said radial and thrust bearing means, the closure means at the lower end of the motor including a cap member with a central opening, an inverted generally cup-shaped support having a base portion for supporting said thrust bearing means and a depending axially extending threaded flange portion threadedly mounted in said central opening whereby said support is adjustable axially of said central opening for regulating the axial position of the rotor, an expansible diaphragm underlying said support and extending across said opening for sealing the lower end of the motor and accommodating expansion of said confined liquid, and locking means below said diaphragm and holding the peripheral edge portion thereof seated against the axial end of said flange portion of the support and in liquid-tight sealed relation in said opening.

11. A submersible motor comprising an upright annular stator, a rotor positioned within the stator, radial bearing means at the opposite ends of the motor for journaling the rotor, thrust bearing means at the lower end of said rotor, closure means at the ends of the motor for substantially closing the motor interior and thereby permitting the motor to be prefilled with an initial substantially confined quantity of liquid whereby to insure lubrication of said radial and thrust bearing means, the closure means at the lower end of the motor including a cap member with a central opening, an inverted generally cup-shaped support having an upwardly bulged base portion for supporting said thrust bearing means and a depending axial flange portion, said flange portion being threadedly secured in said central opening whereby said support is adjustable axially of said opening for regulating the axial position of the rotor, an inverted rubber cup member extending axially in generally nested relation within said support, the base of said rubber cup providing an expansible diaphragm underlying said support in spaced relation below the upwardly bulged central portion thereof and extending across said opening for sealing the lower end of the motor and accommodating expansion of said confined liquid, said rubber cup also having a radially extending peripheral flange seated against the lower axial end of the flange portion of said support, and locking means mounted in said opening for holding the peripheral flange portion of said rubber cup tightly against said axial end of said support and in liquid-tight sealed relation in said opening.

12. A submersible motor comprising an upright annular stator, a rotor positioned within the stator, radial bearing means at the opposite ends of the motor for journaling the rotor, thrust bearing means at the lower end of said rotor, closure means at the ends of the motor for substantially closing the motor interior and thereby permitting the motor to be prefilled with an initial substantially confined quantity of liquid whereby to insure lubrication of said radial and thrust bearing means, the closure means at the lower end of the motor including a cap member with a central opening, an axially adjustable support for supporting said thrust bearing means and adjustably mounted in said opening for regulating the axial position of the rotor, an expansible diaphragm underlying said support and extending across said opening for sealing the lower end of the motor and accommodating expansion of said confined liquid, and a locking disk frictionally fitted within said opening below said diaphragm for holding the latter in seated relation against said support and in liquid-tight sealed relation in said opening, said locking disk having aperture means for exposing the outer side of the diaphragm to the pressure of the outside liquid when the motor is submerged.

References Cited in the file of this patent

UNITED STATES PATENTS

| | | |
|---|---|---|
| 1,657,900 | Richter | Jan. 31, 1928 |
| 1,879,628 | Mendenhall | Sept. 27, 1932 |
| 2,002,913 | Mendenhall et al. | May 28, 1935 |
| 2,218,937 | Myers et al. | Oct. 22, 1940 |
| 2,258,064 | Myers | Oct. 7, 1941 |
| 2,569,741 | Arutunoff | Oct. 2, 1951 |
| 2,674,702 | Arutunoff | Apr. 6, 1954 |
| 2,739,252 | Patterson et al. | Mar. 20, 1956 |